United States Patent Office 3,401,032
Patented Sept. 10, 1968

3,401,032
REMOVAL OF IMPURITIES FROM NICKEL OXIDE GRANULES
Louis Secondo Renzoni, Willowdale, Ontario, Walter Curlook and Alexander Illis, Copper Cliff, Ontario, and Gyula Borbely, Welland, Ontario, Canada, assignors to The International Nickel Company, Inc., New York, N.Y., a company of Delaware
No Drawing. Filed Nov. 8, 1965, Ser. No. 506,898
Claims priority, application Canada, July 9, 1965, 935,455
13 Claims. (Cl. 75—1)

ABSTRACT OF THE DISCLOSURE

Impurities such as copper, lead, zinc and arsenic along with the precious metals are removed from granular, high temperature nickel-containing oxide by heating a bed of the oxide to a temperature of at least about 2000° F. in an atmosphere non-reducing to nickel oxide and passing therethrough a small but effective amount of chlorine to chlorinate and volatilize the impurities and the precious metals.

---

The present invention relates to the purification of nickel oxide and more particularly to the treatment of nickel oxide granules in an agitated state to selectively chlorinate and volatilize metal impurities therefrom.

The method for producing nickel oxide granules by the fluid bed roasting of pelletized crude nickel sulfide at a high production rate employing a temperature above the softening temperature of nickel sulfide to yield an oxide product low in sulfur is described in Canadian Patent No. 614,701. This product is commercial source of nickel which is satisfactory for many areas of application. The product comprises small granules having a particle size substantially all in the range from about minus 10 mesh to about plus 100 mesh with a bulk density of about 190 to 250 pounds per cubic foot. The product contains about 75% nickel, a small amount, e.g., 0.05%, of sulfur and not more than about 0.5% iron. The product frequently contains copper at the level of up to about 1% and may also contain small amounts of other impurities including up to about 0.05% lead, up to about 0.06% arsenic, up to about 1% cobalt, up to about 1 troy ounce per ton of precious metals, etc. It is found that in certain commercial applications the impurity contents, e.g., copper, lead, arsenic, sulfur and the precious metals, found in the present commercial granular nickel oxide are objectionable and the commercial acceptability of the granular nickel oxide material would be enhanced if impurities such as copper were reduced to low levels. We have now discovered an effective process for the treatment of granular nickel oxide so as to remove completely or to decrease substantially its impurity contents such as copper, lead, arsenic, sulfur and the precious metals.

It is an object of the present invention to provide a process for purifying granular nickel oxide at an economically feasible rate.

Another object of the invention is to provide a process for treating granular nickel oxide in the fluidized bed to decrease metal impurities contained therein to acceptable levels.

The invention also contemplates providing a process for selectively chlorinating granular nickel oxide in a fluid bed so as to remove impurity metals contained therein by volatilization.

A still further object of the invention is the provision of a process wherein a number of dissimilar metal impurities can be selectively removed simultaneously from granular nickel oxide.

An even further object of the present invention is to provide a process for purifying nickel oxide and for simultaneously recovering valuable precious metals.

Other objects and advantages will become apparent from the following description.

Generally speaking, the present invention is directed to a process for purifying nickel-containing oxide granules, such as nickel oxide granules, containing at least one chlorinatable impurity by selective chlorination comprising establishing an agitated bed of nickel oxide, contacting said bed with a gaseous atmosphere essentially non-reducing to nickel oxide and containing at least a small amount of chlorine effective to combine with said chlorinatable impurity, heating said bed to a temperature of at least about 2000° F., selectively chlorinating said chlorinatable impurity by reaction with said atmosphere and volatilizing the impurity from the bed to provide a purified particulate oxide product. The invention is particularly effective in relation to the treatment of a nickel oxide feed obtained by roasting impure nickel sulfide at a temperature above, e.g., about 200° F. or more above, the softening temperature of nickel sulfide and containing up to about 5%, e.g., from about 0.3% to about 3%, copper; up to about 0.1%, e.g., from about 0.005% to about 0.05%, lead; up to about 0.1%, e.g., from about 0.005% to about 0.06%, arsenic; up to about 1% iron, up to about 1% cobalt, up to about 1 troy ounce per ton of precious metals, up to about 0.5% sulfur, from about 70% to about 77% nickel with the remainder being essentially oxygen.

Advantageously, the process is carried out in continuous fashion in a fluid bed reactor using a granular feed material having a particle size in the fluidizable range and the heat required to maintain the fluidized bed at a temperature of about 2000° F. or higher is derived from the combustion of fuel in the reactor. In this manner the fluidizing medium usually contains gaseous products derived from the essentially complete combustion of the fuel. The chlorine in the fluidizing medium is advantageously introduced below the grate in the reactor to insure maximum contact with the fluidized nickel oxide. The chlorine can also be introduced above the grate as long as adequate mixing of the chlorine and the nickel oxide bed is maintained. Advantageously, the rate of the chlorine addition to the fluid bed reactor is maintained in the range of about 0.5% to about 5% by weight of the nickel oxide feed. Chlorinatable metal impurities which can be selectively removed by chlorination and volatilization in accordance with the invention include copper, lead, arsenic, sulfur and the precious metals. Iron and cobalt contained in the charge are essentially unaffected by the process provided in accordance with the invention. In order to prevent undue losses of nickel during the chlorination while selectively chlorinating and volatilizing impurities such as copper, arsenic, lead, sulfur and precious metals, the fluidizing medium is maintained oxidizing to nickel, i.e., essentially non-reducing to nickel oxide. The role of temperature is also important in accordance with the invention to achieve a high rate of chlorination and volatilization of impurities. Thus, the reaction bed should be maintained at a temperature of at least 2000° F. up to a temperature slightly below the incipient fusion temperature for the bed material. For most purposes a temperature range of about 2000° F. to about 2300° F., e.g., about 2200° F., is satisfactory.

The fluidizing medium containing the volatile chlorinated impurities exhausted from the fluid bed reactor is treated to collect the chlorinated impurities. Once the volatile chlorides of the impurities are collected, the chlorides can then be treated by conventional techniques to recover the individual impurities. Such a procedure is highly advantageous from the economic viewpoint since it enables recovery of valuable precious metals contained in the feed whereas prior techniques did not provide for recovery of precious metals associated with nickel oxide. The invention thus not only provides a means for purifying nickel oxide but also provides a means whereby precious metals contained therein can be extracted and recovered.

In carrying the invention into practice, particulate nickel oxide produced by fluid bed roasting of crude nickel sulfide at temperatures substantially in excess of the softening point of nickel sulfide is fed into a fluid bed reactor on a continuous basis. The nickel oxide is maintained in a fluidized state by air introduced below the grate of the reactor. Advantageously, the temperature of the nickel oxide is maintained at the required temperatures of above about 2000° F. by the combustion of a fuel such as pulverized coke or coal, methane, a liquid hydrocarbon, etc., introduced into the fluidized bed of nickel oxide at a location above the grate of the reactor. Alternatively, indirect heating may be employed to maintain the bed temperature at the required level, but this procedure requires more elaborate and expensive equipment. Gaseous chlorine in amounts of about 0.5 to about 7 weight percent of the feed is also introduced either above or below the grate of the reactor as long as adequate mixing of the chlorine and ambient atmosphere in the bed is insured. When the atmosphere within the reactor is controlled within the limits hereinafter described, the chlorine selectively reacts with the metal impurities to form volatile chlorides which are collected from the exit gases and are recovered by known techniques. Crude nickel oxide is continuously fed into the reactor at about the same rate as purified nickel oxide is withdrawn from the reactor. Purified nickel oxide is withdrawn from the bed at such a rate as to provide an average residence time in the reactor of about 30 minutes to about 3 hours.

Simultaneous removal of two or more impurities requires accurate control of the chemical activity of the atmosphere within the fluidized nickel oxide. As will be shown hereinafter, impurity elimination increases as the amount of chlorine increases but nickel losses also increase with increases in chlorine concentration within the bed. Consequently, chlorine is introduced into the reactor at a rate of at least about 0.5 but not more than about 7 weight percent of the feed to obtain effective removal of impurities from the feed without encountering unduly high losses of nickel. In addition to the chlorine concentration, the atmosphere must be further controlled such that upon reaction of the fluidizing air and the fuel the atmosphere is non-reducing to nickel oxide and advantageously contains less than about 5 percent free oxygen and advantageously less than about 15 percent water vapor. Excessive free oxygen contents in the fluid bed atmosphere lower the efficiency of removal of the impurities. Water vapor, when present in excessive amounts, may react undesirably with chlorine to produce excessive amounts of hydrogen chloride. This effect results in increased chlorine consumption and in reduced efficiency of impurity removal. However, if water vapor (steam) in the atmosphere is kept below about 15 percent and free oxygen content is kept below about 5 percent, the elimination of impurities is maximized while the production and volatilization of nickel chloride is minimized. Satisfactory atmospheres contain in addition to the effective quantities of chlorine set forth hereinbefore, up to about 5% oxygen, up to about 15% water vapor, up to about 20% of carbon dioxide and the balance essentially nitrogen. Carbon dioxide in the aforesaid amounts and under operating conditions behaves as an inert constituent in a manner similar to nitrogen.

The effects of temperature and of atmosphere composition are illustrated in the following Tables I to III. In each of the tables, a bed of nickel oxide granules substantially all in the range from about minus 10 mesh to plus 100 mesh obtained from roasted pelletized crude nickel sulfide at a roasting temperature above about 2000° F. was treated in a furnace with a treating atmosphere flow rate through the bed of five cubic feet per hour per pound of feed. The chlorinating temperature and/or the composition of the treating atmosphere is set forth for each table.

Table I confirms the importance of maintaining a chlorination temperature above about 2000° F. Nickel oxide granules obtained by roasting crude nickel sulfide were heated at varying temperatures for one hour in a gaseous atmosphere containing 1% chlorine, 2% oxygen, 15% carbon dioxide and 82% nitrogen, by volume. The amount of chlorine used was equal to about one percent by weight of the charge. Reference to Table I shows that chlorinating temperatures below about 2000° F. are quite ineffective in removing lead, arsenic and copper. At temperatures above about 2000° F., on the other hand, the impurity contents are readily decreased.

TABLE I

| Test No. | Treatment temp., ° F. | Analysis, percent | | | |
|---|---|---|---|---|---|
| | | Cu | Pb | As | S |
| Head sample | | 0.73 | 0.015 | 0.022 | 0.03 |
| 1 | 1,550 | 0.56 | 0.014 | 0.020 | <0.01 |
| 2 | 2,000 | 0.42 | 0.008 | 0.0006 | <0.01 |
| 3 | 2,100 | 0.40 | 0.006 | 0.0007 | <0.01 |
| 4 | 2,200 | 0.35 | 0.004 | 0.0006 | <0.01 |

As pointed out hereinbefore, gaseous chlorine is used in the chlorinating atmosphere in amounts of about 0.5 to about 7.0 weight percent of the feed. Table II shows that increasing quantities of gaseous chlorine in the chlorinating atmosphere as contemplated in accordance with the invention increase the removal of copper, lead and arsenic. The tests in Table II were conducted at 2100° F. for one hour employing a diluent gas containing 2% oxygen, 15% carbon dioxide and 83% nitrogen.

TABLE II

| Test No. | Chlorine addition, percent by weight of charge | Analysis, percent | | | |
|---|---|---|---|---|---|
| | | Cu | Pb | As | S |
| Head sample | | 0.73 | 0.015 | 0.022 | 0.03 |
| 1 | 0.5 | 0.47 | 0.008 | 0.0016 | <0.01 |
| 2 | 1.0 | 0.40 | 0.006 | 0.0007 | <0.01 |
| 3 | 1.5 | 0.33 | 0.004 | 0.0006 | <0.01 |
| 4 | 2.0 | 0.25 | 0.002 | 0.0006 | <0.01 |
| 5 | 5.0 | 0.07 | 0.0009 | 0.0007 | <0.01 |

The importance of the combination of temperature and chlorine addition is shown by a test in which nickel oxide granules similar in composition and thermal processing history to the nickel oxide granules of Tables I and II were treated at 1550° F. for one hour with a chlorine addition of 10 weight percent of the charge. In this test the copper content was decreased from 0.73 percent to 0.52 percent, a result which is only slightly different from the copper removal obtained with a chlorine addition of only one percent as shown by Test No. 1 in Table I. On the other hand, Table II illustrates that, at chlorinating temperatures at about 2000° F. or higher, increased amounts of chlorine greatly increase the efficiency of impurity removal.

The effects of varying amounts of steam in the treating atmosphere are illustrated in Table III. Granules of nickel oxide were heated to 2100° F. for three hours in a gas mixture containing about 1% $Cl_2$, 2% $O_2$, 15% $CO_2$ and 82% $N_2$, by volume, and upon addition of steam the percentages of constituents of the treating atmosphere were correspondingly reduced. The amount of chlorine introduced was equivalent to three percent by weight of the charge. The gas flow rate was maintained at 5 cubic feet per hour per pound of charge. The results show that increasing amounts of water vapor up to about 15% by volume enhance the removal of arsenic and lead whereas the removal of copper is inhibited by water vapor although the water vapor content of the treating atmosphere can be increased to a level of about 10% or in some cases to about 15% by volume without unduly deleterious effects upon copper removal. The sulfur content of the head sample was 0.035 percent and in Tests 1 to 7 the final sulfur content was lowered to less than 0.01 percent.

TABLE III

| Test No. | Steam volume, percent | Analysis, percent | | | P.M.[1] |
|---|---|---|---|---|---|
| | | Cu | Pb | As | |
| Head sample | | 0.71 | 0.012 | 0.018 | 0.098 |
| 1 | 0 | 0.20 | 0.004 | 0.001 | 0.031 |
| 2 | 5 | 0.25 | 0.0028 | 0.0005 | 0.045 |
| 3 | 10 | 0.28 | 0.0029 | 0.0009 | 0.045 |
| 4 | 15 | 0.34 | 0.0020 | 0.007 | 0.040 |
| 5 | 20 | 0.39 | 0.0028 | 0.006 | 0.051 |
| 6 | 25 | 0.41 | 0.0028 | 0.0006 | 0.068 |
| 7 | 30 | 0.44 | 0.0029 | 0.0006 | 0.064 |

[1] Precious metals in troy ounces per ton.

It has been found that the prior processing history of the nickel oxide treated in accordance with the invention affects the efficiency of the chlorination reaction. Thus, material roasted at 2150° F. and having a sulfur content of about 0.3% is more amenable to chlorination to remove impurity metal contents than is material roasted at 2250° F. and containing about 0.03% of sulfur. Physical examination of nickel oxide granules produced at lower roasting temperatures such as about 2150° F. as compared to material produced at higher roasting temperatures such as 2250° F. gives no hint as to the explanation of this phenomenon but the tests in Table IV demonstrate that copper removal is more effective in nickel oxide granules that have been produced at the lower temperature fluid bed roasting of nickel oxide.

Table IV provides the results of tests upon nickel oxide granules produced by roasting at 2250° F. to reduce the sulfur level to 0.03 percent and nickel oxide granules prdouced by roasting at 2150° F. to reduce the sulfur content to 0.10 percent. Nickel oxide granules produced by roasting crude nickel sulfide at 2250° F. and at 2150° F. were each chlorinated under two sets of conditions as noted in Table IV so that the chlorine addition was equal to one weight percent of the feed in the first test and two weight percent of the feed in the second test. The temperature of the chlorination treatment was 2100° F. The results in Table IV show that the removal of copper proceeds to a greater extent in nickel oxide granules produced from crude nickel sulfide roasted at lower temperatures for the same chlorine additions.

TABLE IV

| Test No. | Temperature of sulfide roast, °F. | Chlorine addition, Weight percent of charge | Cu | S |
|---|---|---|---|---|
| Head sample | 2,250 | | 0.71 | 0.03 |
| Do | 2,150 | | 0.71 | 0.10 |
| 1 | 2,250 | 1 | 0.37 | <0.01 |
| 2 | 2,150 | 1 | 0.28 | <0.01 |
| 3 | 2,250 | 2 | 0.26 | <0.01 |
| 4 | 2,150 | 2 | 0.20 | <0.01 |

The ability to treat successfully nickel oxide granules obtained at the lower roasting temperatures provides a greater throughput of material through the roaster and contributes in an important way to the overall production economy of the process.

The following examples will enable the skilled artisan ot better understand the hereinbefore presented results when adapted to a continuous plant-scale operation.

EXAMPLE I

Nickel oxide granules resulting from the roasting of crude nickel sulfide at temperatures above about 2000° F. were fed into a fluid bed reactor at a rate of 20 tons per day (t.p.d.). The nickel oxide granule bed was maintained at 2250 ° F. by introducing fuel oil into the bed at a rate of 13.6 Imperial gallons per hour. The fuel oil was combusted with the fluidizing media, air, which was introduced below the grate of the reactor at a rate of 480 standard cubic feet per minute. Chlorine consumption was equivalent to 3.9 weight percent of the feed. The exit gases analyzed, by volume, about 2.4 percent oxygen, about 10 percent steam, about 12 percent carbon dioxide and the remainder essentially nitrogen. The composition of the feed and product were as follows:

| | Percent Ni | Percent Cu | Percent S | Percent Pb | Percent As | Precious metals, oz./ton |
|---|---|---|---|---|---|---|
| Feed | 75.3 | 0.62 | 0.037 | 0.012 | 0.018 | 0.088 |
| Product | 75.9 | 0.18 | 0.002 | 0.0024 | 0.002 | 0.038 |

EXAMPLE II

To illustrate the effect of prior roasting temperatures, tests were conducted on nickel oxide granules produced by high temperature sulfide roasting and by lower temperature sulfide roasting. Test A shows the results of the high temperature roast while Test B shows the lower temperature sulfide roast. Nickel oxide granules were continuously fed into a fluid bed reactor. The bed of nickel oxide granules was maintained at 2265° F. by burning fuel oil at a rate of 12 to 13 Imperial gallons an hour which was introduced into the fluidized nickel oxide. Combustion of the fuel oil was supported by the fluidizing air which was introduced below the grate of the reactor at a rate of 390 to 425 standard cubic feet per minute. Chlorine was added to the fluidizing air above the grate at such a rate that chlorine consumption for Test A was 7.0 weight percent of the feed and for Test B was 3.4 weight percent of the feed. The feed rate was 1350 to 1400 pounds per hour which provided an average residence time of 2.6 to 2.9 hours. The exit gases analyzed 1.6 to 1.9 percent by volume of free oxygen. The results of Tests A and B are as follows:

TEST A

| | Percent Ni | Percent Cu | Percent Pb | Percent As | Percent S |
|---|---|---|---|---|---|
| Feed | 75.40 | 0.65 | 0.0062 | 0.013 | 0.050 |
| Product | 76.20 | 0.23 | 0.002 | 0.001 | 0.003 |

TEST B

| | Percent Ni | Percent Cu | Percent Pb | Percent As | Percent S |
|---|---|---|---|---|---|
| Feed | 75.80 | 0.63 | 0.011 | 0.034 | 0.16 |
| Product | 76.20 | 0.19 | 0.002 | 0.001 | 0.003 |

Comparing the results of Tests A and B, it becomes evident that the copper content is decreased more readily in the low temperature roasted nickel oxide even though only one half of the chlorine addition used in chlorinating the high temperature roasted nickel oxide was employed.

EXAMPLE III

A copper-nickel sulfide ore was treated by ore dressing means to produce a high-grade pentlandite concentrate. This concentrate was agglomerated into pellets of about ⅛ inch in diameter using a conventional pelletizing dics. The pellets containing about 8% moisture were fed into a fluid bed roaster at the rate of 15 t.p.d. while the bed temperature in the vessel was maintained well above the softening temperature of the sulfide, i.e., at about 2000° F. The granular calcined product analyzed about 0.1% sulfur. The cooled granular calcine was fed into a second fluid bed roaster at a rate of 16 t.p.d. while maintaining a bed temperature of 2260° F. Chlorine gas equivalent to 4.2% by weight of solid feed was introduced into the bed above the grate. The oxygen content of the off-gases was maintained at about 2%.

Analyses of the pentlandite concentrate, and of granular oxide products before and after chlorination, are shown below:

| Analysis | Pentlandite concentrate | Granular oxide | |
|---|---|---|---|
| | | Before chlorination | After chlorination |
| Percent Cu | 0.11 | 0.12 | 0.030 |
| Percent Ni | 28.4 | 32.3 | 32.2 |
| Percent Fe | 35.0 | 38.5 | 38.6 |
| Percent S | 34.2 | 0.10 | 0.004 |
| Percent Pb | 0.003 | 0.003 | 0.001 |
| Percent As | 0.056 | 0.045 | 0.015 |
| Oz./ton PMs | 0.150 | 0.170 | 0.085 |

Chlorination at below 2000° F. of a similar pentlandite concentrate roasted above its softening temperature lowered the copper content by only 30%.

It is to be understood that the granular nickel oxide materials described in the various examples and test series set forth hereinbefore, except for Example III, also contained about 0.8% cobalt and about 0.2% iron and that the cobalt and iron contents were substantially unaffected by the treatment.

While the theoretical considerations underlying the present invention are not fully understood and while many competing reactions take place under the conditions encountered in carrying out the process embodying the present invention, we have nevertheless found special circumstances and operating conditions under which nickel oxide can be treated so as to remove therefrom substantial amounts of chlorinatable impurities including copper, lead, arsenic, and precious metals while minimizing the losses of nickel. In addition, under the conditions of the invention the consumption of chlorine is held to a minimum. The temperature and atmosphere conditions employed in accordance with the invention are important and must be controlled in the manner described hereinbefore.

The present invention is particularly applicable to nickel oxide obtained from the fluid bed roasting of crude nickel sulfide in a process as described in Canadian Patent No. 614,701. Nickel oxide granules resulting from the above-identified process contain, in addition to copper, lead, arsenic and precious metals, iron, cobalt and sulfur. Since the present invention also eliminates sulfur from the nickel oxide granules, the roasting operation of the above-identified process can be conducted at lower temperatures and with greater throughput rates. The only limitation on the sulfur content of the nickel oxide granules is that unduly high sulfur contents increase chlorine consumption.

Although the invention has been illustrated by the treatment of granular nickel oxide materials containing substantial amounts of nickel, e.g., about 70 to about 77 weight percent nickel, it is to be understood that other granular nickel-containing oxide materials having the characteristic granular form of oxide materials produced by roasting the corresponding sulfides at temperatures above the softening temperatures of the sulfides, e.g., temperatures at least about 20° F. or even 200° F. or more above the softening temperatures thereof, can advantageously be treated in accordance with the process of the present invention. Thus, pentlandite, (FeNi)S, or other sulfidic materials containing even higher amounts of iron, e.g., up to about 50% iron, and also optionally containing cobalt even in major amounts as well as impurities, etc., which have been roasted at temperatures above their softening points (above about 1600° F.) to produce a granular oxide product, can be treated in accordance with the present invention to produce a purified oxide product.

It is to be understood that although the process is advantageously conducted in a fluid bed reactor, the process can be conducted in other types of reactors which provide for agitation of the bed material. For example, a rotary furnace is satisfactory in practicing the novel process. It will be apprepciated that when a rotary furnace is employed, the feed material may have a particle size which is finer or coarser than feed material having a particle size range which renders it amenable to fluid bed treatment.

It is to be observed that the present invention provides a process for purifying nickel oxide by selective chlorination and volatilization of impurities. The process provides a single set of conditions which are particularly useful when treating nickel oxide in an oil-fired fluid bed reactor.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for purifying granular nickel oxide containing up to about 1% iron and produced by roasting nickel sulfide above the softening temperature thereof and containing at least one chlorinatable impurity from the group consisting of copper, lead, arsenic and precious metals, comprising heating a bed of said granular nickel oxide to a temperature of at least about 2000° F. by passing through said bed a treating atmosphere non-reducing to nickel oxide and containing chlorine in an amount effective to combine with said chlorinatable impurity to selectively chlorinate and volatilize the impurity metal contents of the bed material and to produce a purified nickel oxide, said atmosphere being produced by combusting a fuel selected from the group consisting of pulverized coke, pulverized coal, methane and liquid hydrocarbons.

2. A process as described in claim 1 wherein a feed stream of said granular nickel oxide is fed to said bed and chlorine is present in said atmosphere in amounts of about 0.5% to about 7% by weight of said feed material.

3. A process for purifying granular nickel oxide containing up to about 1% iron and produced by roasting nickel sulfide above its softening temperature and which contains at least one chlorinatable impurity from the group consisting of copper, lead, arsenic and precious metals which comprises establishing an agitated bed of nickel oxide granules and heating said bed to a temperature of at least about 2000° F. by contacting said bed with an atmosphere oxidizing to nickel and containing a small but effective amount of chlorine to selectively chlorinate said chlorinatable impurity and to volatize the resulting chlorides from said bed to produce a purified nickel oxide, said atmosphere being produced by combusting a fuel.

4. A process as described in claim 3 wherein the nickel oxide is heated at a temperature between about 2000° F. and about 2300° F.

5. A process as described in claim 4 wherein a feed stream of granular nickel oxide is fed to said bed and chlorine is present in the atmosphere in amounts of about 0.5 to about 5.0 percent by weight of the nickel oxide feed.

6. The process for purifying nickel oxide granules containing up to about 1% iron and produced by roasting nickel sulfide above its softening temperature and containing at least one chlorinatable impurity by selective chlorination which comprises passing a fluidizing medium non-reducing to nickel oxide and containing a small but effective amount of chlorine through a body of granular nickel oxide to establish and maintain said body in a fluidized state said fluidizing medium having a temperature sufficiently high to heat said fluidized body to a temperature of at least about 2000° F., feeding to said fluidized body a stream of said nickel oxide granules containing at least one chlorinatable impurity to effect chlorination and volatilization of said chlorinatable impurity in and from said fluidized body and removing from said body a nickel oxide product having a substantially lower content of said chlorinatable impurity, said fluidizing medium containing the products of reaction of air and fuel.

7. The process for purifying by selective chlorination nickel oxide granules containing up to about 1% iron and produced by roasting nickel sulfide above its softening temperature and containing at least one chlorinatable impurity from the group consisting of copper, lead, arsenic and precious metals which comprises establishing a bed of said nickel oxide granules in fluidized suspension employing as a fluidizing medium a gas mixture, non-reducing to nickel oxide, containing a small but effective amount of chlorine and having a temperature sufficiently high to maintain said fluidized bed at a temperature of at least about 2000° F., feeding to said fluidized bed a stream of nickel oxide granules containing at least one chlorinatable impurity from the group consisting of copper, lead, arsenic and precious metals to effect chlorination and volatilization of chlorinatable impurities in and from said bed, and removing from said bed a nickel oxide product having a substantially lower content of chlorinatable impurities, said gas mixture containing the products of reaction of fuel and air.

8. A process as described in claim 7 wherein the bed material is heated at a temperature between about 2000° F. and about 2300° F.

9. A process according to claim 7 wherein the chlorine content in the fluidizing medium is about 0.5% to about 7% by weight of the nickel-containing oxide feed material.

10. The process for purifying nickel oxide granules containing up to about 1% iron and produced by roasting nickel sulfide above its softening temperature and containing at least one chlorinatable impurity by selective chlorination which comprises establishing a fluidized bed of nickel oxide granules by passing air containing a small amount of chlorine effective to combine with chlorinatable impurities through said bed, combusting fuel with the air containing chlorine in said bed to produce a chlorine-containing atmosphere and to heat said bed to a temperature of at least about 2000° F., controlling the bed atmosphere to be non-reducing to nickel oxide and controlling the water vapor content thereof to not more than about 15% by volume and free oxygen content thereof to not more than about 5% by volume, introducing into said bed nickel oxide granules containing at least one chloridizable impurity from the group consisting of copper, lead, arsenic and precious metals, chlorinating and volatilizing said chlorinatable impurity in and from said bed by contact with said chlorine-containing atmosphere and removing nickel oxide granules having a substantially lower content of chlorinatable impurity from said bed.

11. A process according to claim 10 wherein the temperature of said bed material is maintained in the range of at least about 2000° F. to about 2300° F.

12. The process according to claim 11 wherein the chlorine content in the fluidizing medium is about 0.5% to about 7% by weight of the nickel oxide feed.

13. A process according to claim 11 wherein the impurity metal chlorides contained in the exhaust from said fluid bed are worked up to recover the metal values contained therein.

References Cited

UNITED STATES PATENTS

| 1,107,310 | 8/1914 | Johnson | 75—6 |
| 2,848,314 | 8/1958 | Johannsen et al. | 75—9 |
| 3,094,409 | 6/1963 | Renzoni et al. | 75—9 |

FOREIGN PATENTS

| 531,242 | 10/1956 | Canada. |
| 567,905 | 12/1958 | Canada. |
| 593,959 | 3/1960 | Canada. |

BENJAMIN HENKIN, *Primary Examiner.*